United States Patent
Li

(10) Patent No.: US 10,617,185 B2
(45) Date of Patent: Apr. 14, 2020

(54) UMBRELLA WITH UMBRELLA CLOTH CONNECTED USING RETAINING BLOCKS

(71) Applicant: Sheng-Chun Li, Taoyuan (TW)

(72) Inventor: Sheng-Chun Li, Taoyuan (TW)

( * ) Notice: Subject to any disclaimer, the term of this patent is extended or adjusted under 35 U.S.C. 154(b) by 0 days.

(21) Appl. No.: 16/245,087

(22) Filed: Jan. 10, 2019

(65) Prior Publication Data

US 2019/0231041 A1    Aug. 1, 2019

(30) Foreign Application Priority Data

Jan. 30, 2018  (TW) .............................. 107103276 A

(51) Int. Cl.
*A45B 25/18*  (2006.01)
*F16B 2/20*  (2006.01)

(52) U.S. Cl.
CPC ................ *A45B 25/18* (2013.01); *F16B 2/20* (2013.01)

(58) Field of Classification Search
CPC .................................. A45B 25/18; F16B 2/20
See application file for complete search history.

(56) References Cited

U.S. PATENT DOCUMENTS

| | | | | |
|---|---|---|---|---|
| 699,424 | A * | 5/1902 | Stouder ................. | A45B 25/18 135/33.4 |
| 2,453,270 | A * | 11/1948 | Russell ................. | A45B 25/18 135/33.4 |
| 3,354,516 | A * | 11/1967 | Small .................... | A45B 25/00 135/33.5 |
| 5,468,087 | A * | 11/1995 | Tung ..................... | A45B 25/18 135/33.5 |
| 5,529,083 | A * | 6/1996 | Martin .................. | A45B 25/18 135/31 |
| 7,654,274 | B1 * | 2/2010 | Yu ......................... | A45B 25/04 135/31 |
| 8,640,720 | B1 * | 2/2014 | Roberto ................ | A45B 25/18 135/26 |
| 2004/0191450 | A1* | 9/2004 | McGuinness .......... | B29C 53/48 428/36.9 |

* cited by examiner

*Primary Examiner* — David R Dunn
*Assistant Examiner* — Danielle Jackson

(57) ABSTRACT

An umbrella with umbrella cloth connected using retaining blocks is disclosed. The retaining blocks each have a block body fastened one rib of the umbrella, and two retaining plates respectively extended from the periphery of the block body toward each other. The umbrella cloth has a plurality of radial engagement portions at the bottom side thereof that are respectively inserted in between the retaining plates of the retaining blocks and clamped in place by the retaining plates. This design achieves easy assembly, reduces manufacturing costs and extends the lifespan of the umbrella.

2 Claims, 10 Drawing Sheets

__US 10,617,185 B2__

UMBRELLA WITH UMBRELLA CLOTH CONNECTED USING RETAINING BLOCKS

BACKGROUND OF THE INVENTION

1. Field of the Invention

The present invention relates to umbrella technology and more particularly, to an umbrella with umbrella cloth connected using retaining blocks, which uses retaining blocks to secure the umbrella cloth to the ribs by clamping, achieving easy assembly, reducing manufacturing costs and extending the lifespan of the umbrella.

2. Description of the Related Art

In general, the umbrella cloth of an umbrella is fastened to the ribs by stitching. This method is laborious and time consuming, resulting in an increase in the labor cost of umbrella assembly. Further, stability of securing the umbrella cloth to the ribs by stitching is not very reliable. It is easy to cause stitching thread breakage problem during stitching, and the rib is easy to rub with the stitching thread, which causes the stitching thread to be broken and cannot be used.

SUMMARY OF THE INVENTION

The present invention has been accomplished under the circumstances in view. It is therefore the main object of the present invention to provide an umbrella, which uses retaining blocks to secur3 the umbrella cloth to the ribs by clamping, achieving easy assembly, reducing manufacturing costs and extending the lifespan of the umbrella.

To achieve this and other objects of the present invention, an umbrella comprises an umbrella shaft, a plurality of ribs radially pivotally connected to one end of the umbrella shaft, an umbrella cloth covered on the ribs, and a plurality of retaining blocks fastened to the ribs for securing the umbrella cloth. The umbrella cloth has a plurality of radial engagement portions at a bottom side thereof respectively directed to the respective ribs. Each retaining block comprises a block body fastened to one rib, and two retaining plates respectively extended from the periphery of the block body toward each other for securing one radial engagement portion of the umbrella cloth. Each retaining plate comprises a connection segment connected to the block body, and a clamping segment extended from the connection segment remote from the block body. The clamping segments of the two retaining plates are disposed in proximity to each other. The radial engagement portions of the umbrella cloth are respectively secured between the clamping segments of the retaining blocks.

Other advantages and features of the present invention will be fully understood by reference to the following specification in conjunction with the accompanying drawings.

DETAILED DESCRIPTION OF THE PREFERRED EMBODIMENT

Figure 1:
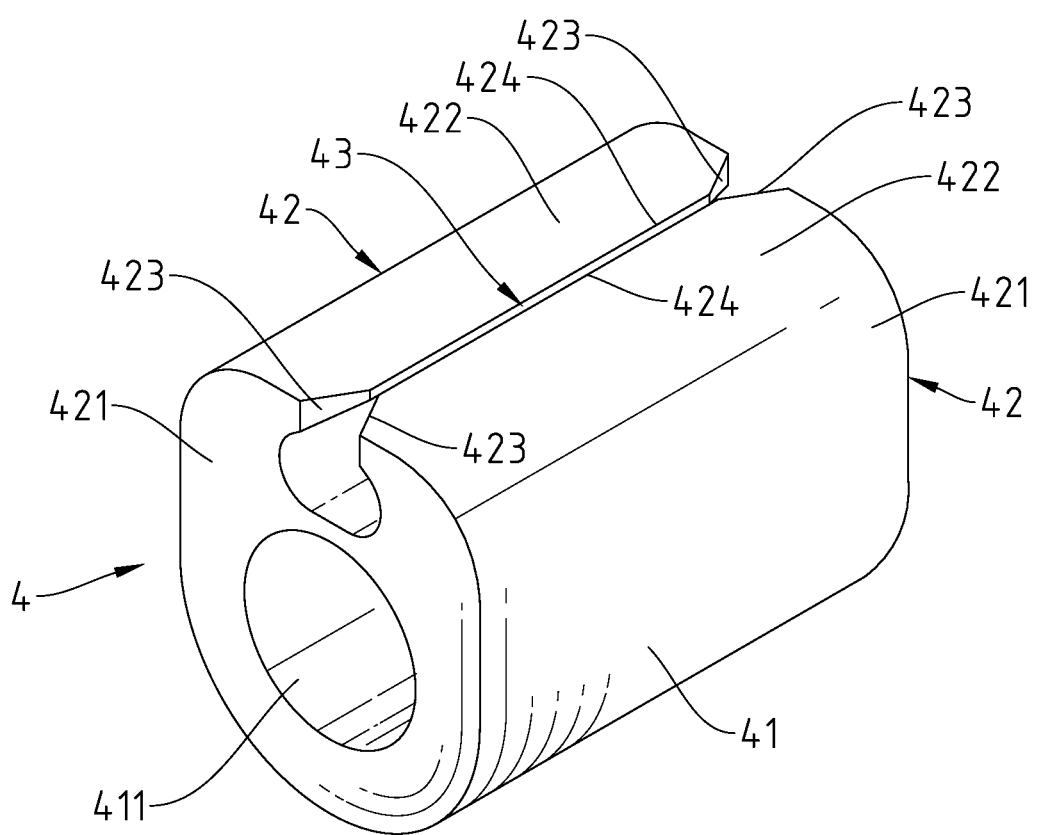
FIG. 1 is an elevational view of a retaining block for use in umbrella in accordance with the present invention.
Figure 2:
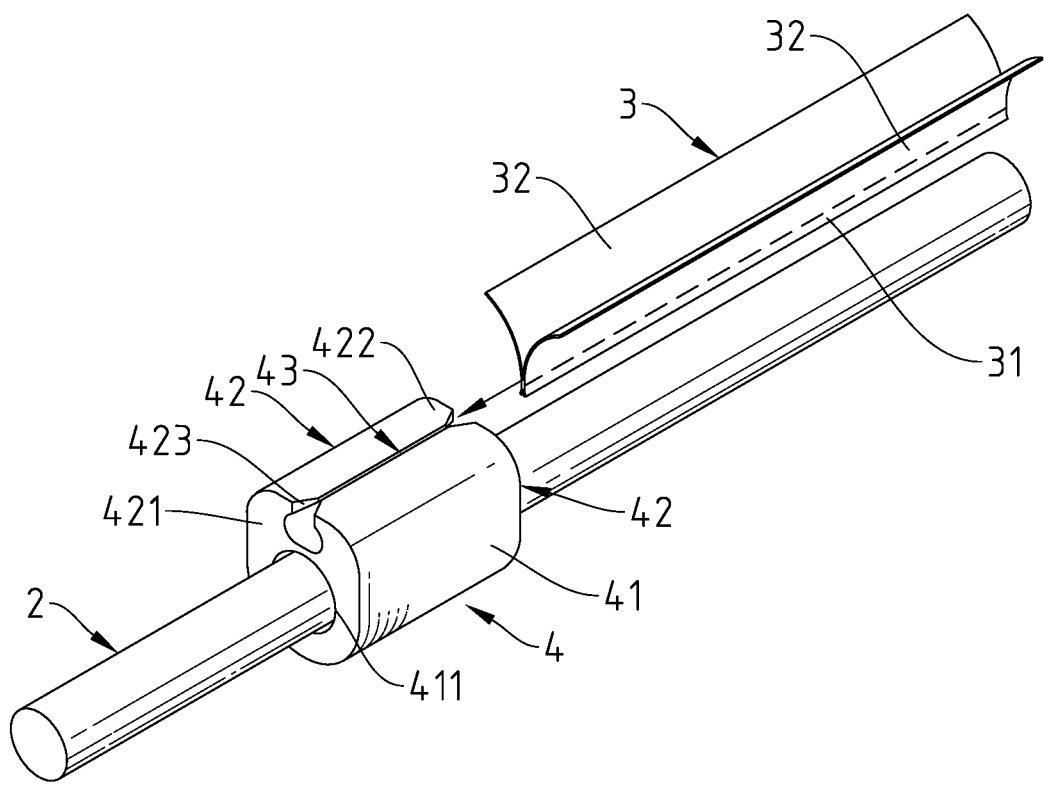
FIG. 2 is an exploded view of a part of an umbrella with umbrella cloth connected using retaining blocks in accordance with the present invention.
Figure 3:
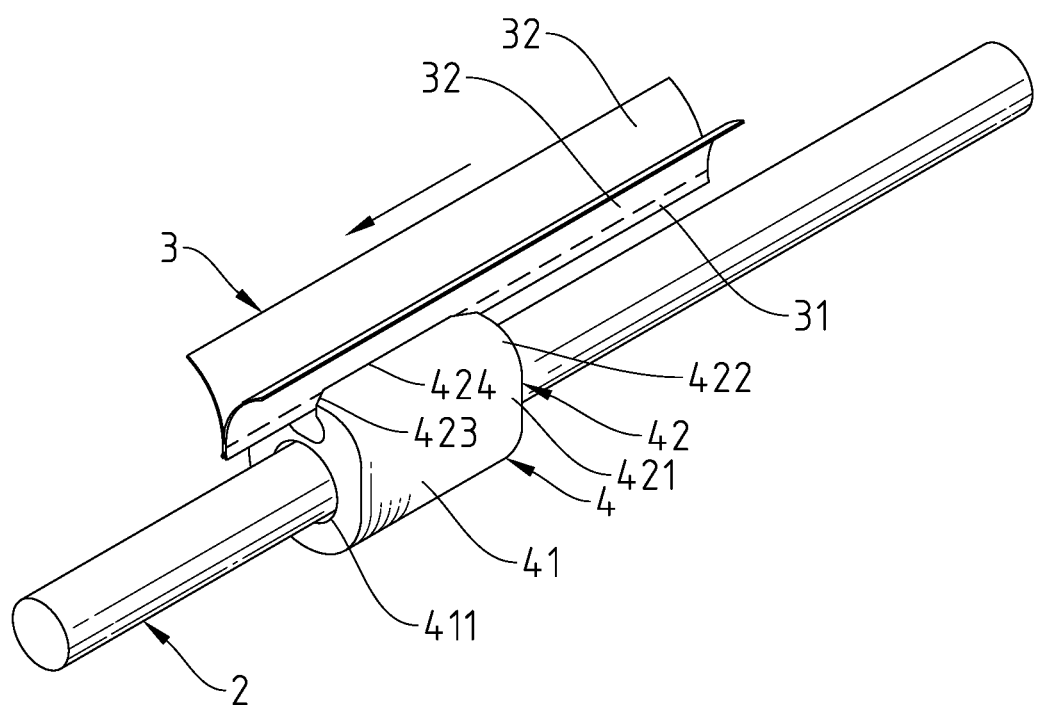
FIG. 3 is a schematic drawing illustrating the mounting operation of a first form of retaining block in accordance with the present invention.
Figure 4:
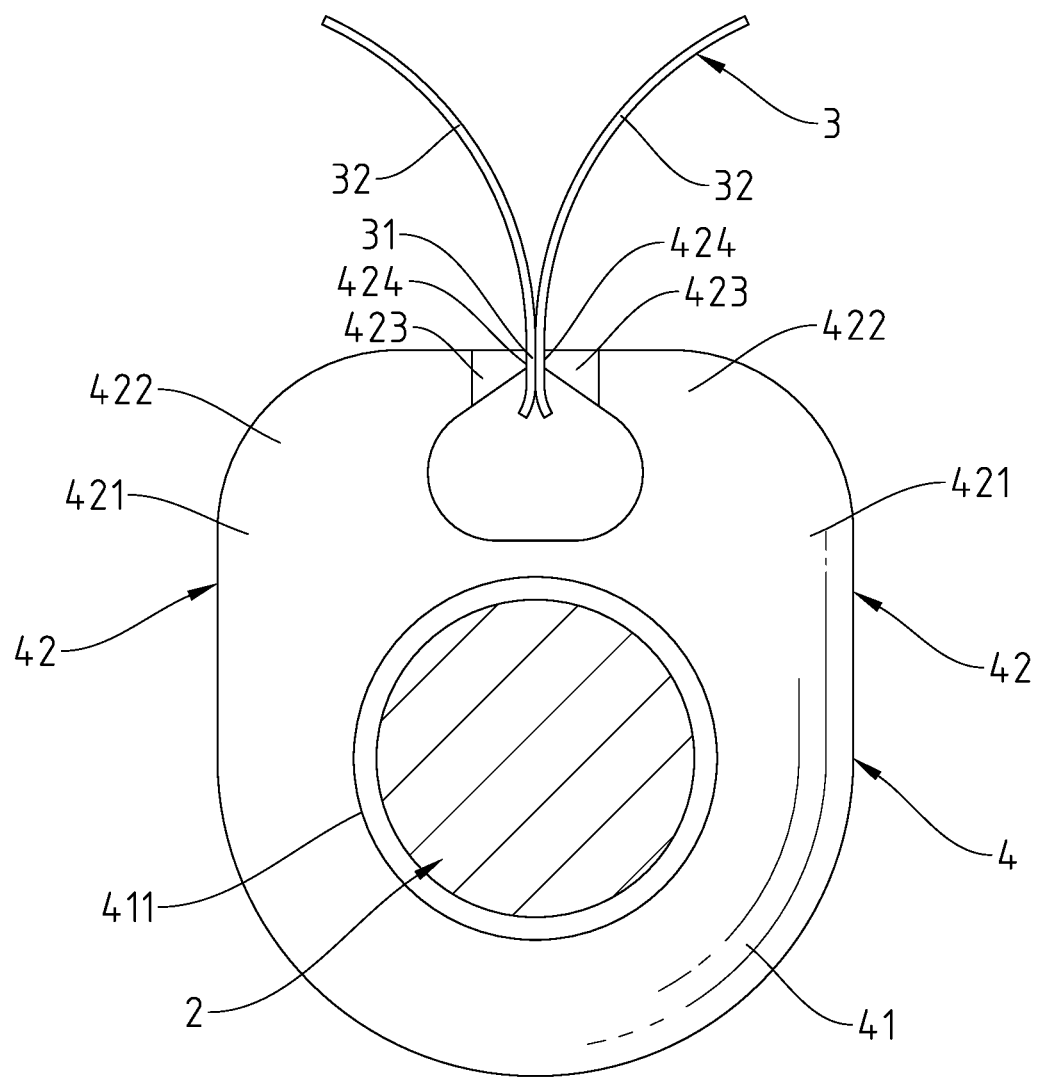
FIG. 4 is a schematic sectional view illustrating the umbrella cloth secured to the first form of retaining block in accordance with the present invention.
Figure 5:
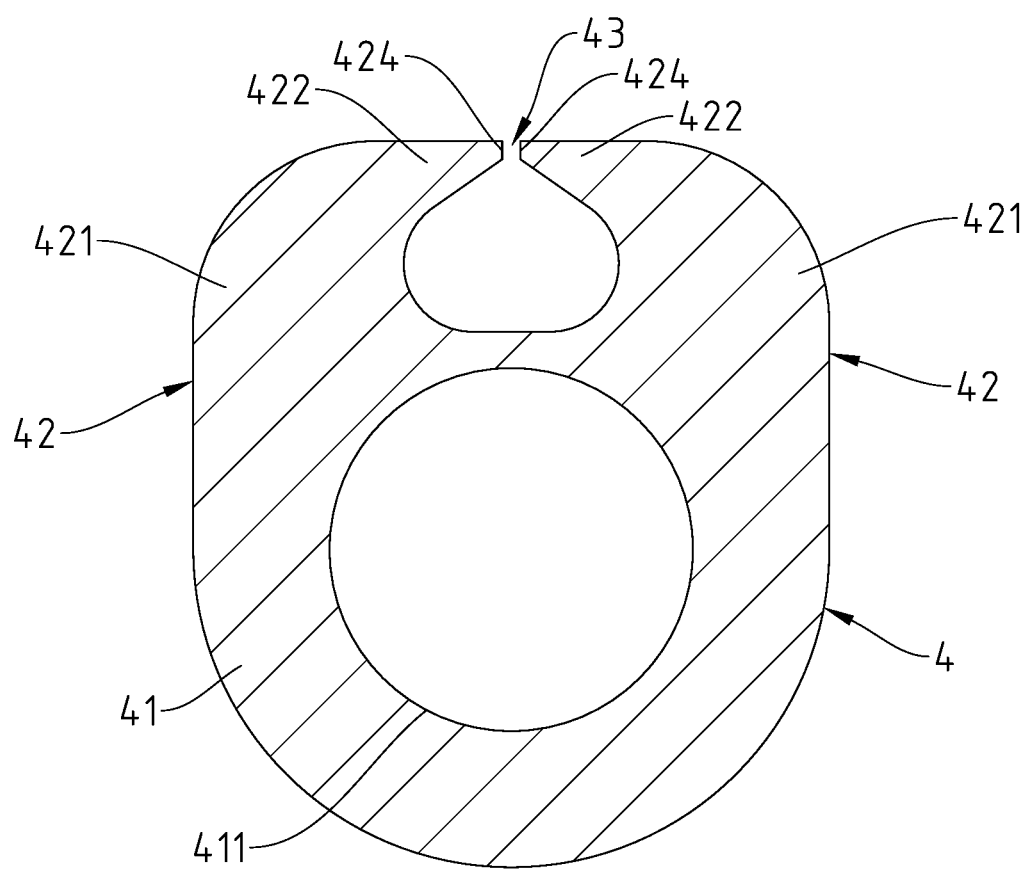
FIG. 5 is a sectional view of the first form of retaining block in accordance with the present invention.
Figure 6:
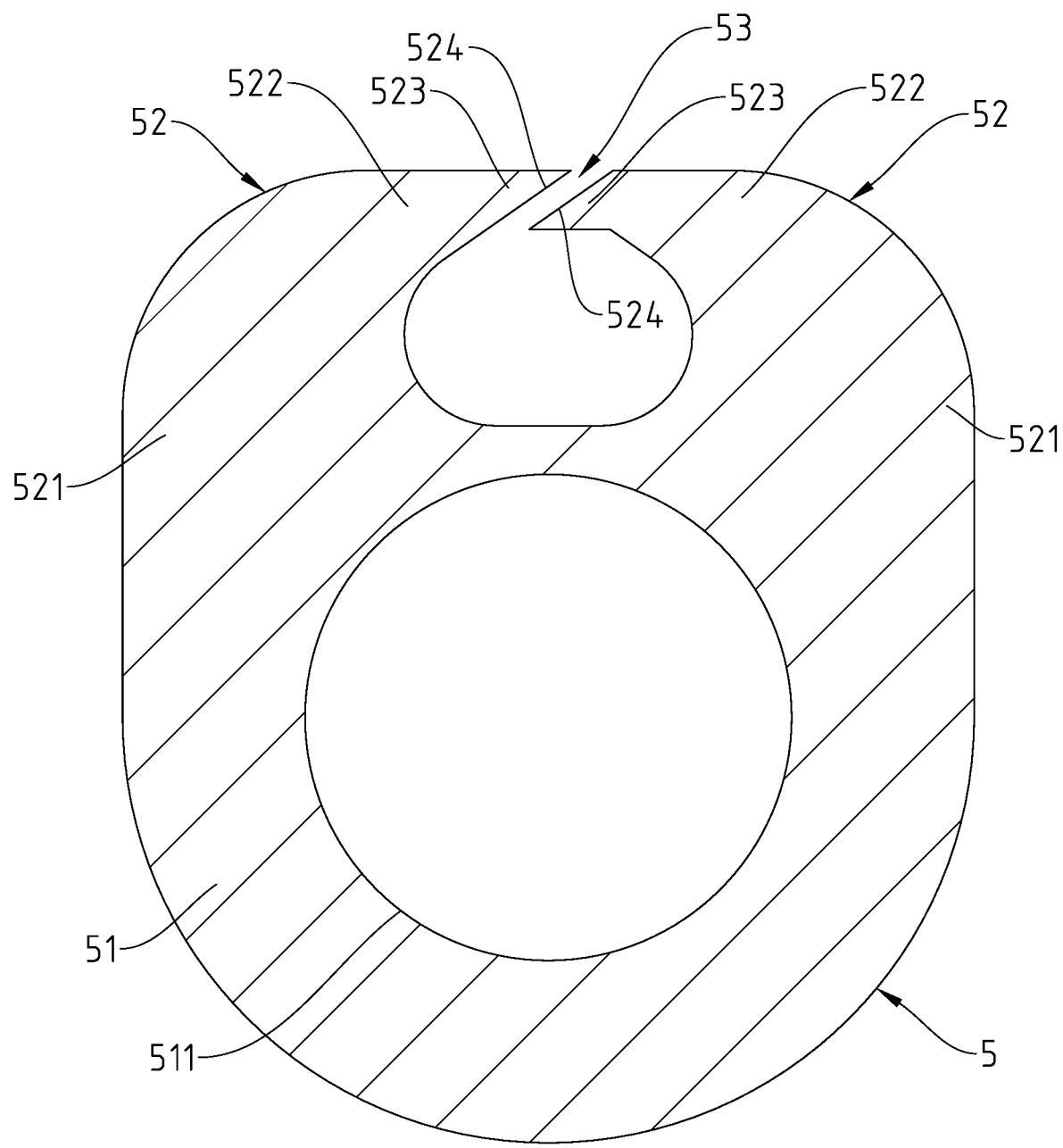
FIG. 6 is a sectional view of a second form of retaining block in accordance with the present invention.
Figure 7:
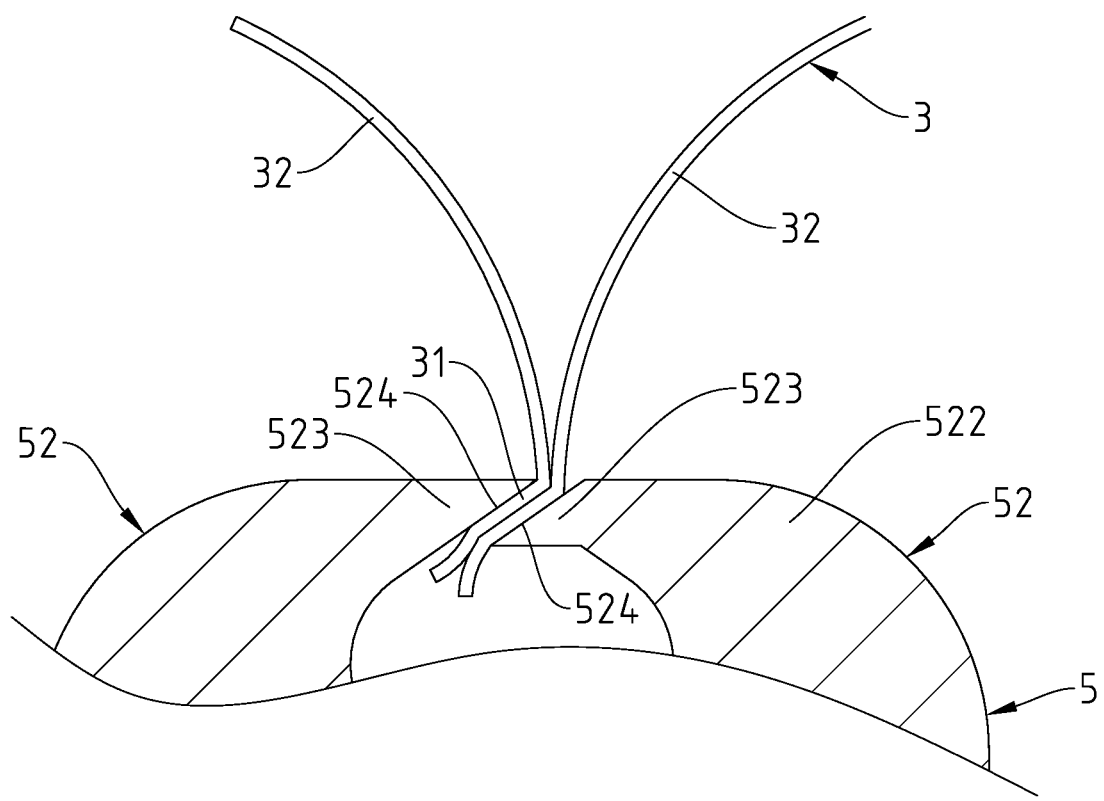
FIG. 7 is a schematic drawing illustrating the umbrella cloth secured to the second form of retaining block in accordance with the present invention.
Figure 8:
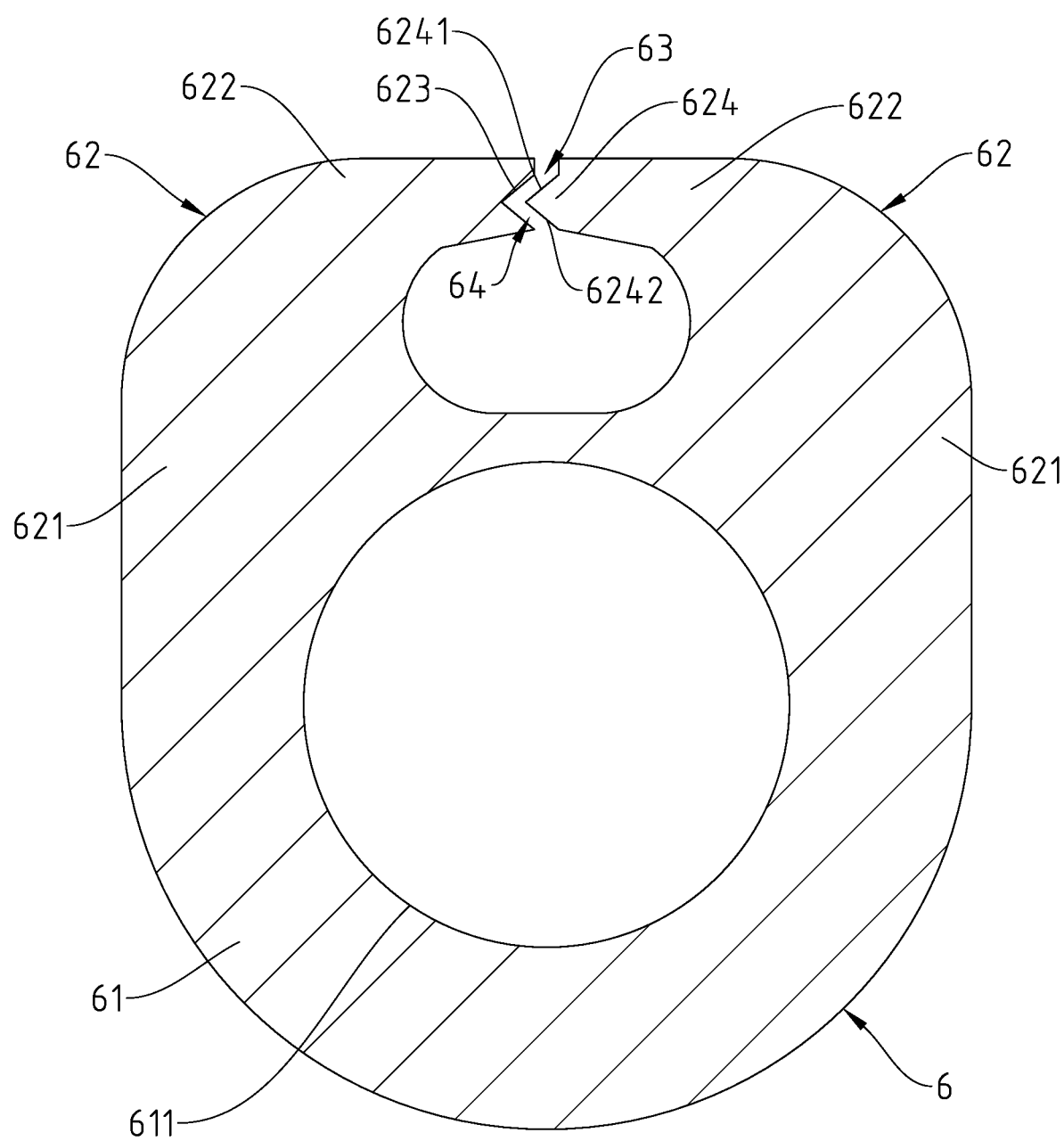
FIG. 8 is a sectional view of a third form of retaining block in accordance with the present invention.
Figure 9:
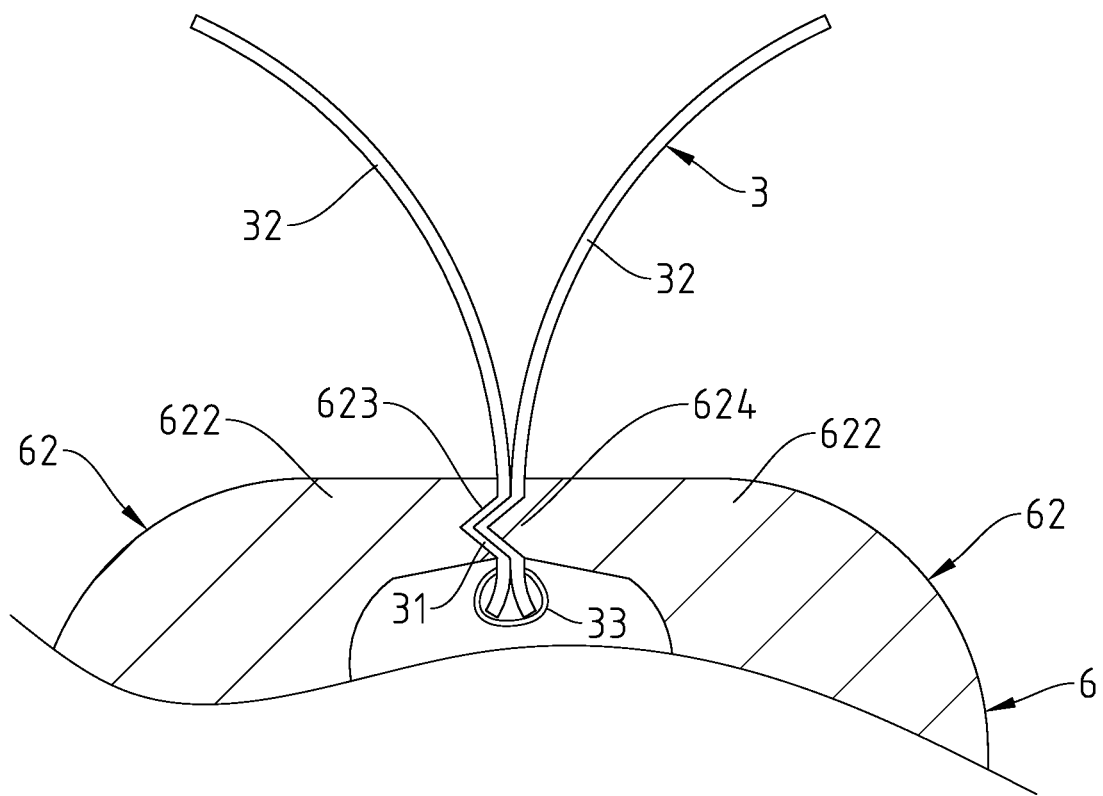
FIG. 9 is a schematic drawing illustrating the umbrella cloth secured to the third form of retaining block in accordance with the present invention.
Figure 10:
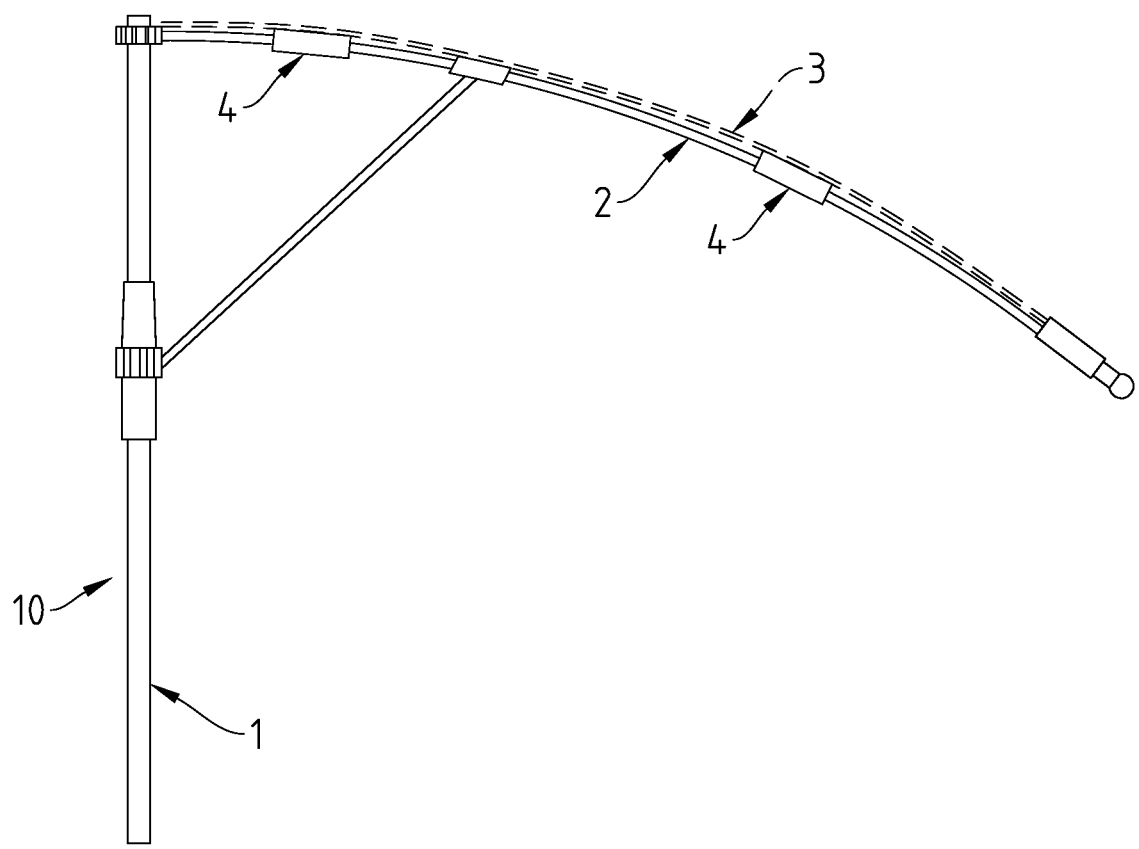
FIG. 10 is a schematic applied view of the present invention.

Referring to FIGS. 1-10, an umbrella with umbrella cloth connected using retaining blocks in accordance with the present invention is shown. The umbrella 10 comprises an umbrella shaft 1, a plurality of ribs 2 radially pivotally connected to one end of the umbrella shaft 1, and an umbrella cloth 3 covered on the ribs 2.

The bottom surface of the umbrella cloth 3 is formed with a plurality of radial engagement portions 31, and the plurality of radial engagement portions 31 are respectively directed to the respective ribs 2. As illustrated, the umbrella cloth 3 is made of a plurality of cloth panels 32 stitched, and the radial engagement portion 31 is a stitching edge between two adjacent cloth panels 32.

Each rib 2 is provided with a plurality of retaining blocks 4 that are spaced apart. Each retaining block 4 comprises a block body 41 fastened to the respective rib 2, and two retaining plates 42 respectively extended from the periphery of the block body 41 toward each other. Each retaining plate 42 comprises a connection segment 421 connected to the block body 41, and a clamping segment 422 extended from the connection segment 421 remote from the block body 41. The clamping segment 422 is springy. The clamping segments 422 of the two retaining plates 42 extend toward each other. Further, the block body 41 of each retaining block 4 defines therein a mounting hole 411. The mounting hole 411 cuts through two opposite ends of the block body 41. Each retaining plate 42 has a beveled guide edge 423 located on at least one of the two opposite ends of the clamping segments 422 of the two retaining plates 42. In this embodiment, two beveled guide edges 423 are respectively formed on the two opposite ends of the clamping segment 422 of each retaining plate 42. The beveled guide edge 423 of each retaining plate 42 slopes inwardly along the length thereof so that the distance between the adjacent beveled guide edges 423 of the clamping segments 422 of the two retaining plates 42 gradually reducing toward the center of the retaining block 4.

As illustrated in FIGS. 2-5, each retaining block 4 further defines an insertion gap 43 between the clamping segments 422 of the two retaining plates 42. The clamping segment 422 of each retaining plate 42 has a bearing surface 424 facing the insertion gap 43. The bearing surface 424 defines with the clamping segment 422 a 90° contained angle. When mounting the retaining blocks 4 to the ribs 2, the ribs 2 are respectively press-fitted into the mounting holes 411 of the retaining blocks 4. After mounting of the retaining blocks 4 to the ribs 2, insert the radial engagement portions 31 of the umbrella cloth 3 along the beveled guide edges 423 into the insertion gaps 43 between the retaining plates 42 of the retaining blocks 4, enabling the radial engagement portions 31 of the umbrella cloth 3 to be clamped by the clamping segments 422 of the retaining plates 42 and secured to the retaining blocks 4 between the bearing surfaces 424 of the retaining plates 42, and thus, the umbrella cloth 3 is firmly secured to the ribs 2.

Due to the design of the beveled guide edges 423 at the opposite ends of the clamping segments 422 of the retaining plates 42 of the retaining block 4, the retaining blocks 4 can be directly mounted to the ribs 2 without considering the insertion direction of the radial engagement portions 31 of the umbrella cloth 3 into the retaining blocks 4 facilitating quick installation.

Referring to FIGS. 5-9 again, in order to prevent separation between the umbrella cloth 3 and the retaining blocks 4, the ends of the clamping segments 422 of the retaining blocks 4 can be variously embodied. In the embodiment shown in FIGS. 6 and 7, the two clamping segments 522 of each retaining block 5 are respectively terminating in a respective retaining tip 523. The retaining tips 523 of the two clamping segments 522 of each retaining block 5 are disposed one above the other with a retaining gap 53 defined therebetween. Each retaining tip 523 defines a bearing edge 524 facing the retaining gap 53. The bearing edge 524 defines with the surface of the clamping segment 522 a contained angle smaller than 90° so that the radial engagement portions 31 of the umbrella cloth 3 can be inserted downwardly through the retaining gaps 53 to elastically deform the respective clamping segments 522 and then obliquely secured between the bearing edges 524 of the clamping segments 522 of the retaining blocks 5. In the embodiment shown in FIGS. 8 and 9, each radial engagement portion 31 of the umbrella cloth 3 is stitched with an edge seam 33; one clamping segment 622 of each retaining block 6 is provided with a groove 623 and the other clamping segment 622 of each retaining block 6 is terminating in a retaining tip 624. The retaining tip 624 suspends in the groove 623. Further, the retaining tip 624 defines a top surface 6241 and an opposing bottom surface 6242. The top surface 6241 defines with the groove 623 a first retaining gap 63. The bottom surface 6242 defines with the groove 623 a second retaining gap 64. The first retaining gap 63 and the second retaining gap 64 are disposed in communication with each other, showing a <-shaped cross section. The radial engagement portions 31 of the umbrella cloth 3 are respectively inserted downwardly into the first retaining gaps 63 and the second retaining gaps 64 and then secured in place by the clamping segments 622 where the ends of the radial engagement portions 31 are respectively supported on the top surfaces 6241 and bottom surfaces 6242 of the retaining tips 624. Thus, the radial engagement portions 31 are curved in the respective grooves 623 and firmly secured to the retaining blocks 6 by the clamping segments 622, and the edge seams 33 of the radial engagement portions 31 of the umbrella cloth 3 are stopped below the bottom edges of the respective grooves 623 and the bottom surfaces 6242 of the retaining tips 624 of the respective clamping segments 622, preventing separation between the umbrella cloth 3 and the retaining blocks 6.

What is claimed is:

1. An umbrella, comprising an umbrella shaft, a plurality of ribs radially pivotally connected to one end of said umbrella shaft and an umbrella cloth covered on said ribs, said umbrella cloth comprising a plurality of radial engagement portions at a bottom side thereof respectively directed to the respective said ribs, wherein:
   each said rib is mounted with a plurality of retaining blocks that are spaced apart, each said retaining block comprising a block body fastened to one said rib and two retaining plates respectively extending from a periphery of said block body toward each other for securing one said radial engagement portion of said umbrella cloth, each said retaining plate comprising a connection segment connected to said block body and a clamping segment extending from said connection segment remote from said block body, said clamping segments of said two retaining plates being disposed in proximity to each other, said radial engagement portions of said umbrella cloth being respectively secured between said clamping segments of said retaining blocks, each said clamping segment comprising a retaining tip, the said retaining tips of said clamping segments of said two retaining plates of each said retaining block being disposed one above the other with a retaining gap defined therebetween, said retaining tip of each said clamping segment comprising a bearing edge, said bearing edge defining with a surface of the associated said clamping segment a contained angle less than 90°.

2. An umbrella, comprising an umbrella shaft, a plurality of ribs radially pivotally connected to one end of said umbrella shaft and an umbrella cloth covered on said ribs, said umbrella cloth comprising a plurality of radial engagement portions at a bottom side thereof respectively directed to the respective said ribs, wherein:
   each said rib is mounted with a plurality of retaining blocks that are spaced apart, each said retaining block comprising a block body fastened to one said rib and two retaining plates respectively extending from a periphery of said block body toward each other for securing one said radial engagement portion of said umbrella cloth, each said retaining plate comprising a connection segment connected to said block body and a clamping segment extending from said connection segment remote from said block body, said clamping segments of said two retaining plates being disposed in proximity to each other, said radial engagement portions of said umbrella cloth being respectively secured between said clamping segments of said retaining blocks, said clamping segment of one said retaining plate of each said retaining block comprising a groove on a distal end thereof, said clamping segment of the other said retaining plate of each said retaining block comprising a retaining tip on a distal end thereof, said retaining tip of the said clamping segment of one said retaining plate of each said retaining block being suspended in the said groove of said clamping segment of the other said retaining plate of the associated said retaining block, said retaining tip defining a top surface and an opposing bottom surface, said top surface defining with the respective said groove a first retaining gap, said bottom surface defining with the respective said groove a second retaining gap, said first retaining gap and said second retaining gap being disposed in communication with each other to have a V-shaped cross-section.

* * * * *